United States Patent [19]
Bennett et al.

[11] Patent Number: 5,528,588
[45] Date of Patent: Jun. 18, 1996

[54] MULTICAST SHARED MEMORY

[75] Inventors: Jon C. R. Bennett, Pittsburgh; Robert Brownhill, Cranberry, both of Pa.

[73] Assignee: Fore Systems, Inc., Warrendale, Pa.

[21] Appl. No.: 305,576

[22] Filed: Sep. 14, 1994

[51] Int. Cl.$^6$ ................................................. H04L 12/56
[52] U.S. Cl. ............................................. 370/60; 370/94.1
[58] Field of Search .......................... 370/60, 60.1, 108, 370/94.1, 94.2, 94.3; 395/250, 842

[56] References Cited

U.S. PATENT DOCUMENTS

| | | | |
|---|---|---|---|
| 5,241,536 | 8/1993 | Grimble et al. | 370/60.1 |
| 5,274,768 | 12/1993 | Traw et al. | 370/94.1 |
| 5,303,233 | 4/1994 | Sugawara | 370/60 |
| 5,345,419 | 9/1994 | Fenstermaker et al. | 365/189.04 |
| 5,365,519 | 11/1994 | Kozani et al. | 370/60 |
| 5,392,280 | 2/1995 | Zheng | 370/60 |

*Primary Examiner*—Wellington Chin
*Assistant Examiner*—Seema S. Rao
*Attorney, Agent, or Firm*—Ansel M. Schwartz

[57] ABSTRACT

A linked list for multicast in an ATM network. The linked list comprises a first cell. The linked list also comprises a plurality of read pointers. Each read pointer is associated with a port. Each read pointer points to the first cell. A multicast system for an ATM network. The system comprises a first port through which a cell passes. The system also comprises a first read pointer associated with the first port. The multicast system additionally comprises at least a second port through which the cell passes. There is at least a second read pointer associated with the second port. The multicast system is comprised of a cell to which each read pointer points. Furthermore, the multicast system is comprised of a controller for controlling when a read pointer reads a cell. The system preferably includes a plurality of cells. Each cell has a cell pointer pointing to a next cell. The plurality of cells forms a linked list. The controller points a read pointer to the next cell after the cell the read pointer was pointing to is read. A method for multicasting. The method comprises the steps of forming a first read pointer and at least a second read pointer. Each read pointer corresponds to a first port and a second port, respectively. Each read pointer points to a cell. Then there is the step of choosing a port. Next there is the step of locating the read pointer for the port. Then there is the step of reading the cell to which the read pointer is pointing. Preferably, the cell includes data and the cell includes a cell pointer pointing to a second cell, if there is a second cell. The first cell and at least the second cell forms a linked list.

36 Claims, 7 Drawing Sheets

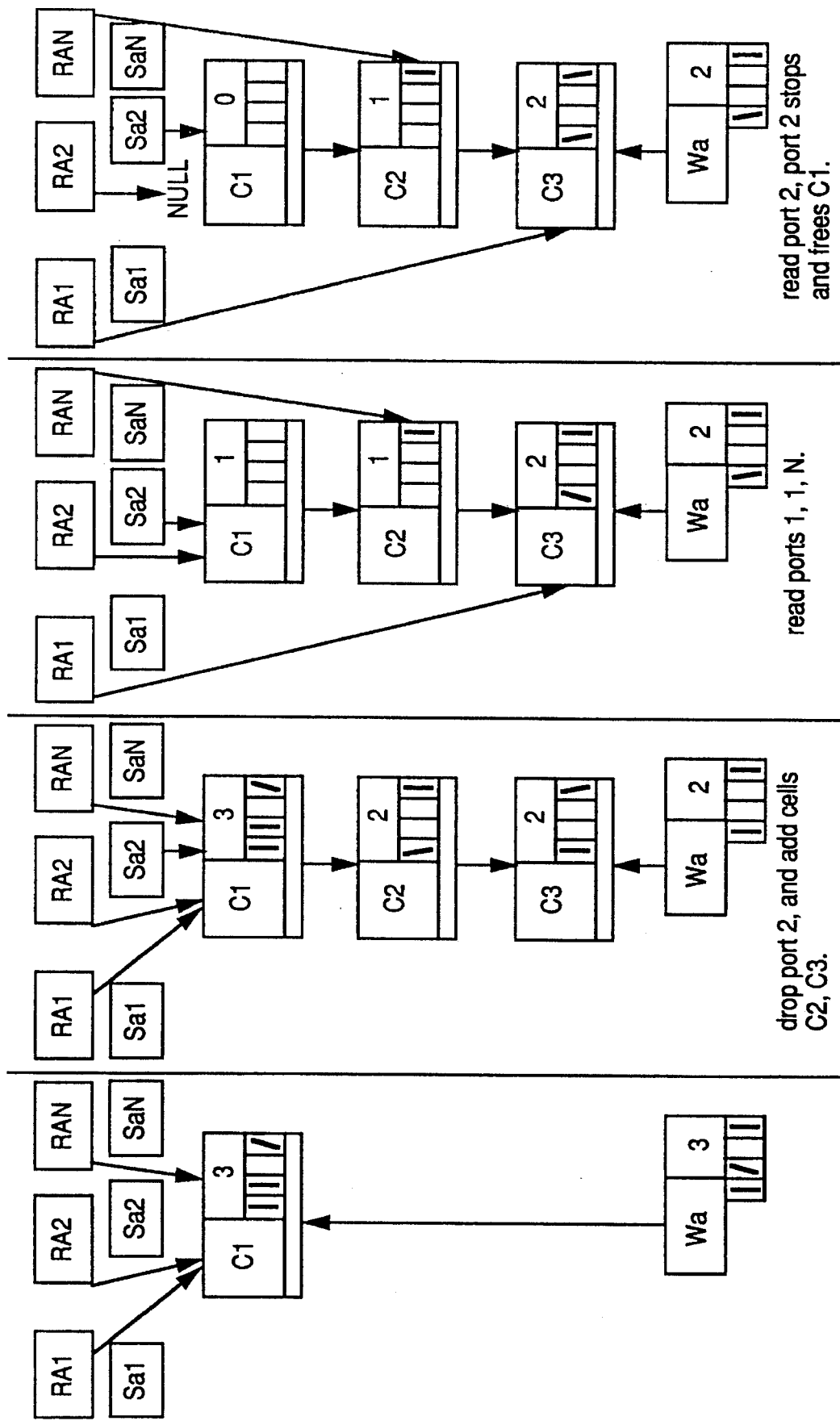

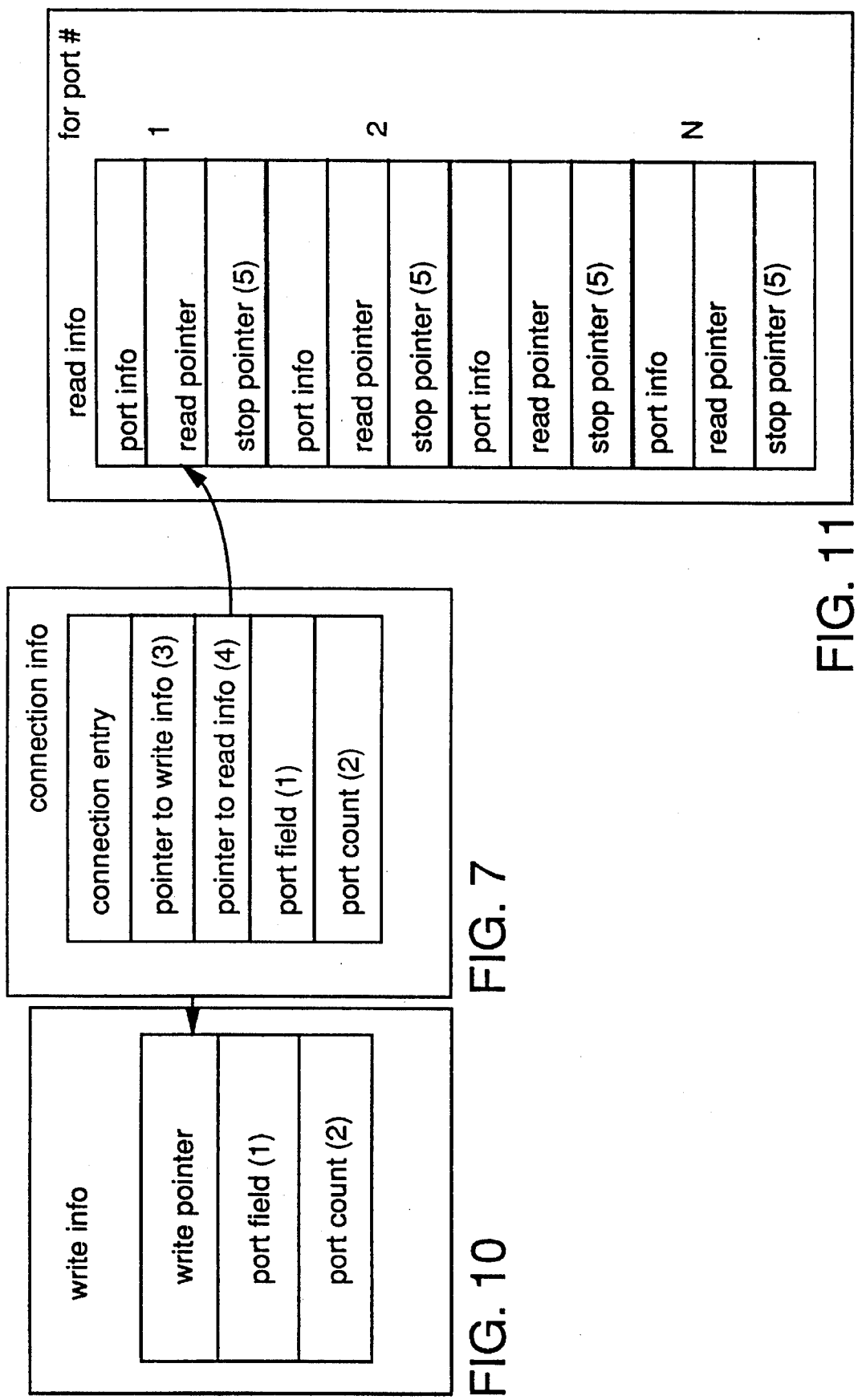

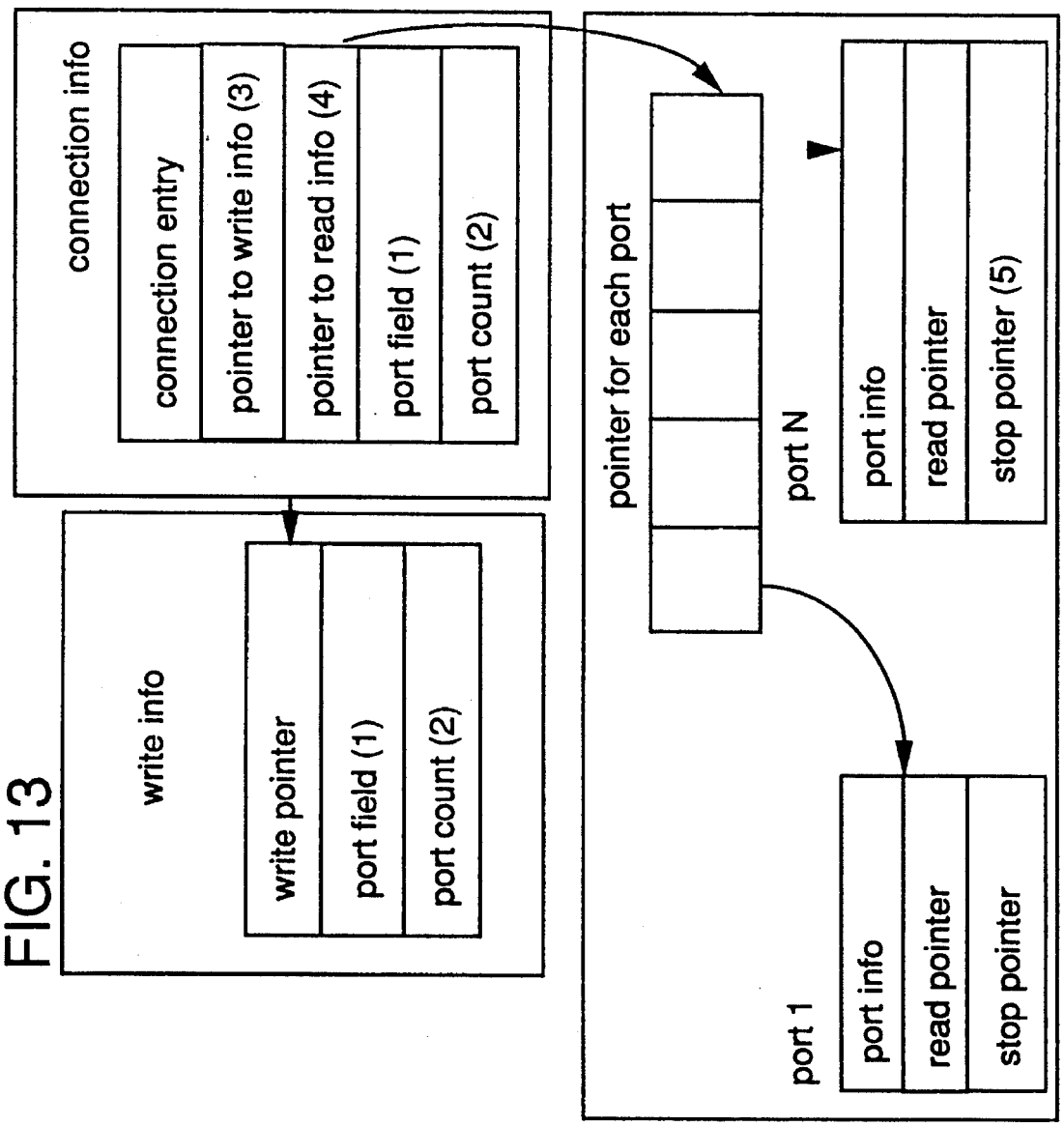

5,528,588

MULTICAST SHARED MEMORY

FIELD OF THE INVENTION

The present invention relates to a multicast of cells in an ATM network. More specifically, the present invention relates to the multicast of cells in an ATM network from a shared memory which is in the form of a linked list.

BACKGROUND OF THE INVENTION

ATM (asynchronous transfer mode) is used for communication purposes in integrated digital networks. Through these networks, ATM cells travel to desired destinations. Due to the complexity and demands on a network, there exists concerns involving traffic control in regard to cells in the network. Moreover, in multicast, considerations must be given to memory utilization in regard to the storage of a cell going to a multitude of locations. Ideally, as little memory as possible should be utilized to maintain the cell for all the different locations to which it will be sent. The present invention provides an efficient approach to providing a cell to a multiplicity of connections for multicast.

SUMMARY OF THE INVENTION

The present invention pertains to a linked list for multicast in an ATM network. The linked list comprises a first cell. The linked list also comprises a plurality of read pointers. Each read pointer is associated with a port. Each read pointer points to the first cell.

The present invention also pertains to a multicast system for an ATM network. The system comprises a first port through which a cell passes. The system also comprises a first read pointer associated with the first port. The multicast system additionally comprises at least a second port through which the cell passes. There is at least a second read pointer associated with the second port. The multicast system is comprised of a cell to which each read pointer points. Furthermore, the multicast system is comprised of a controller for controlling when a read pointer reads a cell. The system preferably includes a plurality of cells. Each cell has a cell pointer pointing to a next cell. The plurality of cells forms a linked list. The controller points a read pointer to the next cell after the cell the read pointer was pointing to is read.

The present invention additionally pertains to a method for multicasting. The method comprises the steps of forming a first read pointer and at least a second read pointer. Each read pointer corresponds to a first port and a second port, respectively. Each read pointer points to a cell. Then there is the step of choosing a port. Next there is the step of locating the read pointer for the port. Then there is the step of reading the cell to which the read pointer is pointing. Preferably, the cell includes data and the cell includes a cell pointer pointing to a second cell, if there is a second cell. The first cell and at least the second cell forms a linked list.

BRIEF DESCRIPTION OF THE DRAWINGS

In the accompanying drawings, the preferred embodiment of the invention and preferred methods of practicing the invention are illustrated in which:

FIG. 2, FIG. 3, FIG. 4 and FIG. 5 are schematic representations of a linked list under dynamic operation.

FIGS. 7, 14 and FIG. 17 are schematic representations of a general connection information memory.

FIG. 10, FIG. 13 and FIG. 16 are schematic representations of a connection write information memory.

FIG. 11, FIG. 12 and FIG. 15 are schematic representations of a connection read information memory.

DESCRIPTION OF THE PREFERRED EMBODIMENT

Figure 1:
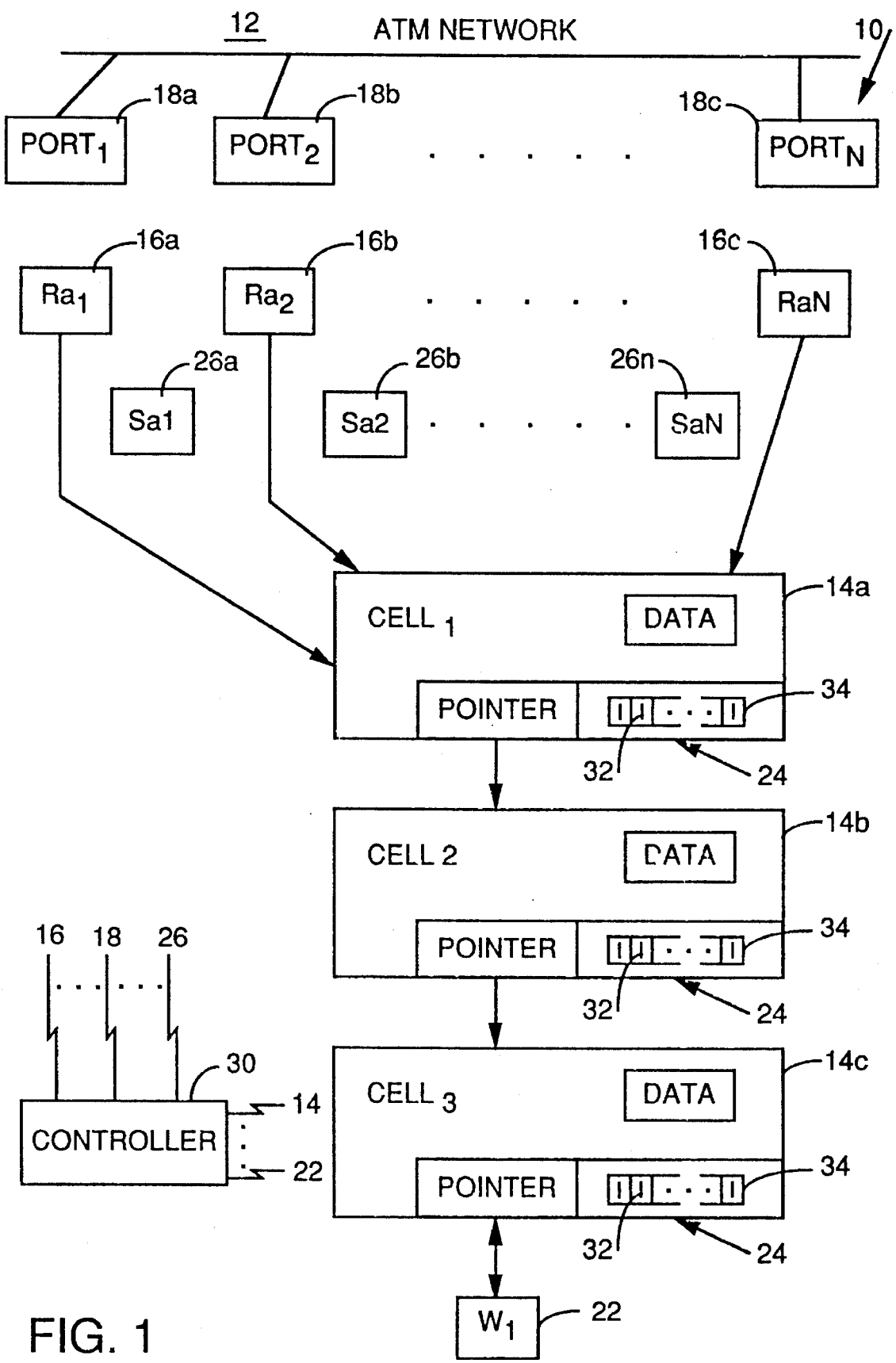
FIG. 1 is a schematic representation a system for multicast in an ATM network showing a linked list.

Referring now to the drawings wherein like reference numerals refer to similar or identical parts throughout the several views, and more specifically to FIG. 1 thereof, there is shown a linked list 10 for multicast in an ATM network 12. The linked list 10 comprises a first cell 14. The linked list 10 also comprises a plurality of read pointers 16. Each read pointer 16 is associated with a port 18. Each read pointer 16 points to the first cell 14. A port 18, for purposes herein, can mean a port internal to a switch, such as a stage of the switch, or an external port of a switch.

Preferably, the linked list 10 includes at least a second cell 14b and wherein each cell 14 includes a cell pointer 20 pointing to a next cell 14, unless it is a last cell 14c. Preferably, each cell 14 includes data. If bandwidth is more important than utilization, then the last cell 14c is not freed, but is maintained. This allows the read pointer to remain established and not have to be possibly rewritten each time a new linked list 10 is formed. If utilization is more important to the overall architecture then the last cell 14c can be freed.

Preferably, the linked list 10 includes a write pointer 22 pointing to the last cell 14c. Each cell 14 can also include a count 24 which identifies all ports 18 the cell 14 will be sent out. The list 10 can also include a stop pointer 26 corresponding with each read pointer 16. The stop pointer 26 identifies the last cell to be sent out of a corresponding port 18.

Figure 6:
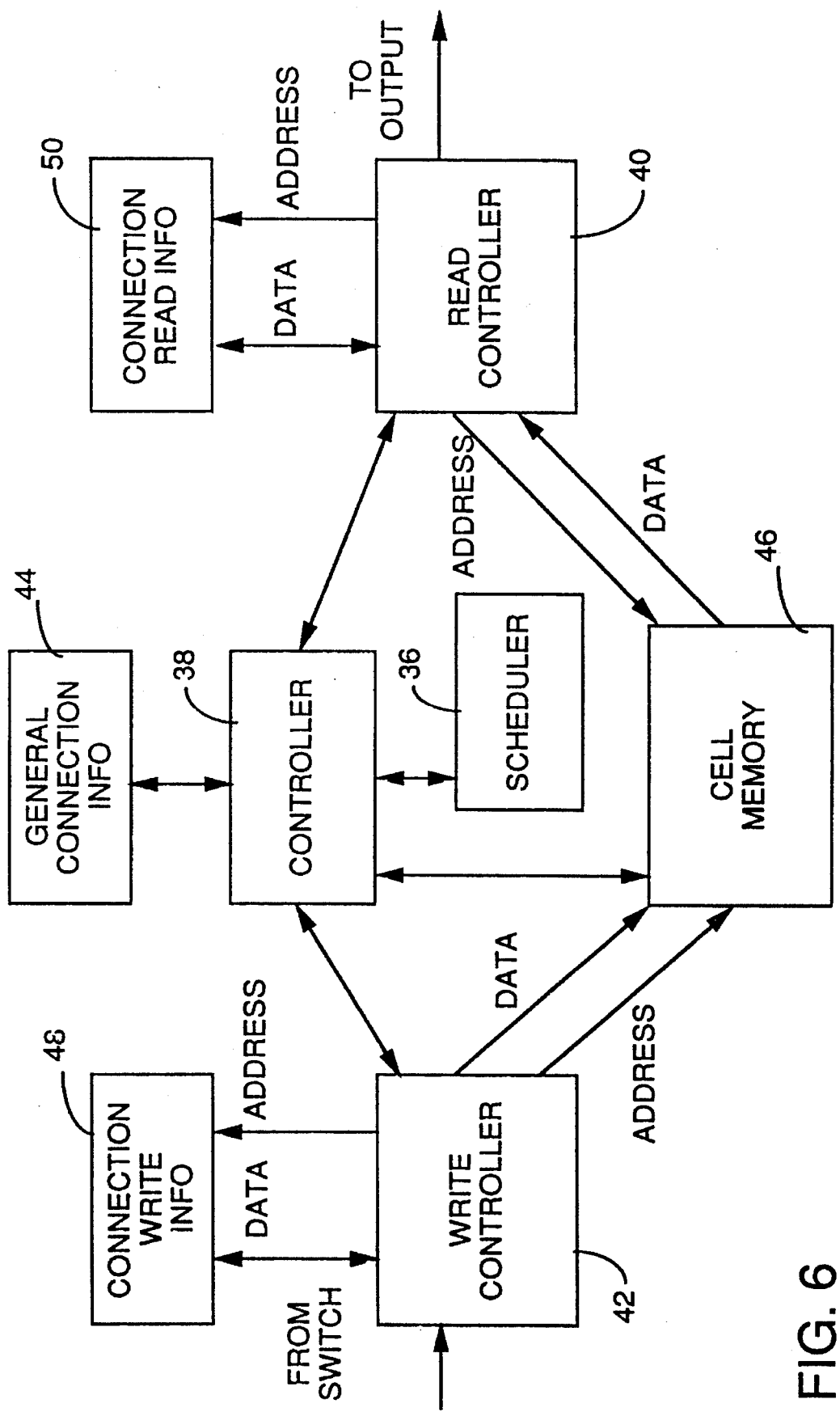
FIG. 6 is a schematic representation of a multicast system for an ATM network.

The present invention also pertains to a multicast system 28 for an ATM network 12. The system 28 comprises a first port 18a through which a cell 14 passes. The system 28 also comprises a first read pointer 16a associated with the first port 18a. The multicast system 28 additionally comprises at least a second port 18b through which the cell 14 passes. There is at least a second read pointer 16b associated with the second port 18b. The multicast system 28 is comprised of a cell 14 to which each read pointer 16 points. Furthermore, the multicast system 28 is comprised of a controller 30, as shown in FIG. 6, for controlling when a read pointer 16 reads a cell 14. The system 28 preferably includes a plurality of cells 14. Each cell 14 has a cell pointer 20 pointing to a next cell. The plurality of cells 14 forms a linked list 10. The controller 30 points a read pointer 16 to the next cell 14 after the cell 14 the read pointer 16 was pointing to is read.

Preferably, the system 28 includes means or a mechanism for pointing to a last cell 14c in the linked list 10. The means or mechanism for pointing to the last cell 14c in the linked list 10 is a write pointer 22. Preferably, each cell 14 has a count 24 which identifies all ports 18 the cell 14 will be sent out. The controller 30 preferably removes a port 18 from the count 24 after the cell 14 the read pointer 16 is pointing to is read. Additionally, the system 28 preferably includes a stop pointer 26 corresponding with each read pointer 16. The stop pointer 26 identifies the last cell 14c that will be sent out the port 18. The controller 30 frees the cell 14 if there is no other port 18 the cell 14 will be sent out and no ports 18 in the count 24 unless it is the last cell 14c in the linked list 10.

The present invention additionally pertains to a method for multicasting. The method comprises the steps of forming a first read pointer 16a and at least a second read pointer 16b. Each read pointer 16 corresponds to a first port 18a and a second port 18b, respectively. Each read pointer 16 points to a cell 14. Then there is the step of choosing a port 18. Next there is the step of locating the read pointer 16 for the port 18. Then there is the step of reading the cell 14 to which the read pointer 16 is pointing. Preferably, the cell includes data and the cell 14 includes a cell pointer 20 pointing to a second cell 14b, if there is a second cell 14b. The first cell 14a and at least the second cell 14b forms a linked list 10.

After the reading step, there is preferably the step of pointing the read pointer 16 to the second cell 14b pointed to by the cell pointer 20 of the cell 14a. After the reading step, there can also be the step of sending the cell 14a out of the port 18a. After the pointing step, there can be the step of checking whether there is at least one other port 18 through which the cell 14a will be sent out. After the checking step, there can be the step of freeing the cell 14a if there is no other port 18 the cell 14a will be sent out.

Preferably, the cell 14 includes a count 24 which identifies all ports 18 the cell 14 will be sent out. Preferably, after the sending step, there is the step of removing from the count 24, the port 18a. The freeing step then includes the step of freeing the cell 14a if there is no other port 18 the cell will be sent out and there are no other ports 18 in the count 24 and the cell 14 is not the last cell 14c in the linked list 10.

After the pointing step, there can be the step of reading the second cell 14b to which the pointer 16a is pointing. The removing step can include the step of decrementing by one a value of the count 24 equal to the number of ports 18 the cell 14 will be sent out.

The checking step can include the step of preparing a stop pointer 26 value for the port 18 with a right pointer value 22 for the port 18. The right pointer 20 points to a last cell 14c to be sent out the port 18. Alternatively, after the pointing step, there can be the step of clearing a bit 32 corresponding to the port 18 from a status field 34 of the cell 14. The freeing step then includes the step of freeing the cell 14 if the status field 34 is empty and the value of the count 24 is equal to 0, and the cell 14 is not the last cell 14c in the linked list.

In an alternative embodiment, the method for multicasting comprises the steps of choosing a port 18. Then there is the step of locating a read pointer 16 for the port 18. Next there is the step of reading a cell 14 to which the read pointer 16 is pointing. Next there is the step of sending the cell 14 out of the port 18. Then there is the step of removing from a count 24 which identifies all ports 18 the cell 14 will be sent out, the port 18. Next there is the step of pointing the read pointer 16 to a second cell 14b pointed to by a cell pointer 20 of the cell 14a if there is a second cell 14b. Then there is the step of checking whether there is at least one other port 18 the cell (14a) will be sent out. Next there is the step of freeing the cell 14a if there is no other port 18 the cell 14a will be sent out and there are no other ports 18 in the count 24, and the cell 14 (14a) is not the last cell 14c in the linked list 10.

After the pointing step, there can be the step of reading the second cell 14b to which the read pointer 16 is pointing. The checking step can include the step of comparing a stop pointer 26 value for the port 18 with a write pointer 22 value for the port 18. The write pointer 22 points to the last cell 14c to be sent out the port 18. Alternatively, after the pointing step, there can be the step of clearing a bit 32 corresponding to the port 18 from a status field 34 of the cell 14. The freeing step can then include the step of freeing the cell 14 if the status field 34 is empty and the value of the count 24 is equal to 0 and the cell 14 is not the last cell 14c of the linked list 10.

In the operation of the invention, a cell C1 is introduced to the system 28. The read pointer Ra1, the read pointer Ra2 and the read pointer RaN corresponding to port 1, port 2 and port N, respectively, point to the cell C1. (The first subscript, for instance a, refers to the connection. The second subscript, for instance 1, refers to the port. Thus, $Ra_1$ refers to the read pointer associated with connection a and port 1.) The count 24 of cell C1 is set to 3 to correspond with the number of ports that will ultimately receive the cell C1 for output, and the status field 34 has bits 32 at corresponding locations which identify the ports to which the cell C1 will ultimately be sent out. Similarly, the write pointer Wa points to cell C1, which being the only cell 14 is the last cell 14c. The write pointer Wa has its count incremented to 3 to reflect the number of ports which receive the cell C1. Additionally, the write pointer Wa has its status field 34 which acts as a reference status field filled with corresponding bits for each port that the cell C1 will be sent out. See FIG. 2. In addition, the stop pointer Sa1, the stop pointer Sa2 and the stop pointer Sa3 which correspond to read pointer Ra1, read pointer Ra2 and read pointer RaN, respectively, do not point to anything since no port is in the process of being dropped.

For exemplary purposes, next, port 2 is dropped from reading any cells of linked list 10, and cells C2 and C3 are added to the link list 10 beginning with cell C1. When the cell C2 is added, the cell pointer 20 of the cell C1 points to the cell C2. Cell C2 has its count 24 incremented to 2 since there are two ports, port 1 and port N which cell C2 will go out. Similarly, cell C2's status field 34 has bits 32 introduced into the locations corresponding to the first port and the Nth port to identify that cell C2 will go out port 1 and port N. Additionally, the cell C2 has its cell pointer 20 pointing to cell C3. Cell C3 also has its count incremented to 2 and bits 32 introduced into the corresponding locations of its status field 34 for port 1 and port N. Furthermore, the read pointer Wa now points to cell C3 since cell C3 is the last cell 14c of the link list 10. The count of the read pointer Wa is changed to 2 since there are only two ports that the link list 10 having cells C1, C2 and C3 will go out and its reference status field has only two bits 32 in it corresponding to the location of port 1 and the location identified port N. Because the port 2 has been dropped before cells C2 and C3 have been added, they do not reflect the presence of port 2 at all. Cell C1 still reflects the presence of port 2 since port 2 was present at the time cell C1 was introduced to the system 28. Also, the stop pointer Sa2 is changed to point to cell C1 since Port 2 has been removed from reading any cells 14 of the linked list 10. Only when a Port 18 is removed from receiving any cells 14 of the linked list 10 is a stop pointer 26 set to point to the last cell of the linked list 10 where that Port is removed from it. See FIG. 3.

For exemplary purposes, next, port 1 reads twice and then port N reads the linked list 10 once. When port 1 reads the first time, the cell C1 is sent out port 1 and read pointer Ra1 is moved to cell C2 since that is where the cell pointer 20 of cell C1 points. Because the stop pointer Sa1 is not set to point to any cell 14, the read pointer is allowed to continue onto the next cell. Since the port 1 has read cell C1, the count 24 of cell C1 is decremented by 1 to reflect the fact that port 1 no longer will read cell C1 since it already has. Additionally, the bit 32 in the status field 34 of C1 is removed to also reflect the fact that the port 1 no longer will read cell C1, since it already has. Similarly, when port 1 is read again, cell C2 goes out port 1, its count 24 is decremented by one and its bit 32 in the status field 34 corresponding to port 1 is removed. The read pointer Ra1 for port 1 then points to cell C3 since cell C3 is the cell to which the cell pointer 20 points. The read pointer Wa is not changed since its count still reflects the fact that there are two ports that are associated with the linked list 10 and its reference status field shows these two ports to be port 1 and port N. Next, port N is read which causes cell C1 to be read out of port N, the bit 32 in the status field 34 of cell C1 corresponding to port N to be removed and the count 24 of cell C1 to be decremented by 1. The read pointer RaN is then moved to cell C2 since cell C2 is the cell 14 to which the cell pointer 20 of cell C1 points. Because the stop pointer SaN is not set to any cell, the pointer RaN moves to cell C2. See FIG. 4.

When port 2 is read, port 2 stops since the stop pointer Sa2 points to cell C1. This indicates that read pointer Ra2 is to stop reading cells 14 in linked list 10 when it points to cell C1. Then the read pointer Ra2 is changed to point to null. The cell C1 has its count reduced to 0 and the bit 32 of the status field 34 corresponding to port 2 removed. Since the count is 0, the status field shows no bits there are no ports still to receive cell C1 and the cell C1 is freed. See FIG. 5.

The presence of the stop pointer 26, which is set to the value of the write pointer at the point where a given port is removed from the multicast of the linked list 10, allows the number of ports that a connection to which a cell is going to be decreased. The stop pointer enables a port to be removed and the linked list 10 to recognize this fact. Similarly, in regard to the status field 34 of each cell, and the counter 24, when the counter 24 reaches 0 in a given cell 14, the cell 14 has been read by all the ports 18 and the memory location associated with the cell can be returned to a free list. In this way, to drop a port 18 from a multicast of a linked list 10, all that has to be done is to unset the bit 32 in the reference status field of the write pointer 22 which corresponds to a given port 18 but keep the old count value. When the next cell 14 is written to the linked list 10, it receives the new status field, but the old count value. Each new cell that arrives also receives the new status field and a count value equal to the number of bits 32 set in the status field 34. Once the status field is added, the full count value becomes redundant, one only needs to keep a count of the number of ports that are being dropped as of that cell. Most cells would have a count of 0. When one or more ports is dropped from the multicast their bits are unsent in the reference status field, and the next cell written to the list has the counter set to the number of ports being dropped. When a cell 14 is read out a port 18, it unsets its bit 32 in the status field 34. If both the status field 34 is empty and the counter 24 is 0, then the cell 14 can be freed. If a cell 14 is read out a port 18 and its bit 32 in the status field 34 was not set, then the counter 24 is decremented by 1 since it is one of the ports being dropped as of this cell, and as above if both the status field 34 is empty and the counter 24 is 0 then the cell 14 can be freed. Since the counter 24 that goes with each cell 14 now only needs to be large enough to count the maximum number of ports 14 that can be dropped as of a given cell 14, as opposed to the maximum number of ports 18 that a cell 14 could go to, it can be smaller. If the maximum number of ports 14 that can be dropped as of a given cell 14 is one then it becomes a one bit counter.

Once the status field 34 is added, the full count value becomes redundant. One only needs to keep a count of the number of ports that are being dropped as of that cell. Most cells would have a count of 0. When one or more ports is dropped from the multicast their bits are unset in the reference status field, and the next cell 14 written to the linked list 10 has it count 24 set to the number of ports being dropped. When a cell is read out a port 18 it unsets its corresponding bit in the status field 34. If both the status field 34 is empty and the count 24 is 0 then the cell can be freed.

If a cell 14 is read out a port 18 and its bit in the status field 34 was not set, then the cell 14 has its count 24 decremented by one since it is one of the ports being dropped as of this cell 14. As above, if both the status field 34 is empty and the counter is 0 then the cell 14 can be freed. Since the count 24 that goes with each cell 14 now only needs to be large enough to count the maximum number of ports that a cell could go to, it can be made smaller. If the maximum number of ports that can be dropped as of a given cell is one then it becomes a one bit counter. When a port is indicated as being dropped, and since there is only one port that can be dropped at a time, then the port being dropped must be that port. If ports 14 are not to be removed from reading the linked list 10, than the stop pointers 26 can be eliminated and just the status field needs to be present.

In yet another alternative embodiment, a cell 14 can have two types of status fields. The need for a count 24 or a corresponding stop pointer 26 is then eliminated. Of these two types of status fields, there is a status field 34 as described above. There is also a status field that has bits which identify whether the cell is the last cell to be read by a port (thus acting like a stop pointer). It can be established in the protocol of the system 28 that the cell 14 is also read if it is the last cell to be read for the corresponding port 18. Or, it can be established the cell is not to be read when it is identified through the additional status field to be the last cell associated with a corresponding port 18. Status fields have the advantage of simply adding or removing bits, as compared with counters which require subtraction in their operation and are thus more complex, relatively speaking. Whether logic constraints or memory constraints are more important determines the ultimate configuration.

The multicast of the linked list 10 is accomplished with system 28 as shown in FIG. 6, which is a schematic representation of the system 28. The system 28 is comprised of a scheduler 36. The scheduler 36 decides which connection should be read by some scheduling algorithm such as the round robin, weighted round robin, weighted fair queuing, virtual clock, etc. Each time a controller 38 desires to send a cell 14 out of a port 18, given the identity of the connections with cells 14 in the linked list 10, the scheduler 36 is called upon. The controller 38 updates the general connection information, manages the list of free cell locations (the "free list"), informs the scheduler 36 about the status of connections based on information it receives from read controller 40 and write controller 42, and instructs the read controller 40 which connections to read. The read controller 40, given a port number and a connection number, reads the next cell for that connection on the given port.

The system 28 is comprised of a general connection information memory 44. As shown in FIG. 7, the general connection information contains pointers to the read and write information entries if they are not either adjacent to the general connection information in the same memory or at the same address if they are in different memories. The "port field" and "port count" entries, if used, may reside with the general connection information or with a connection write information (if both exist, then they may both be with either the general information or the write information, or one might be with each).

Figures 8, 9:
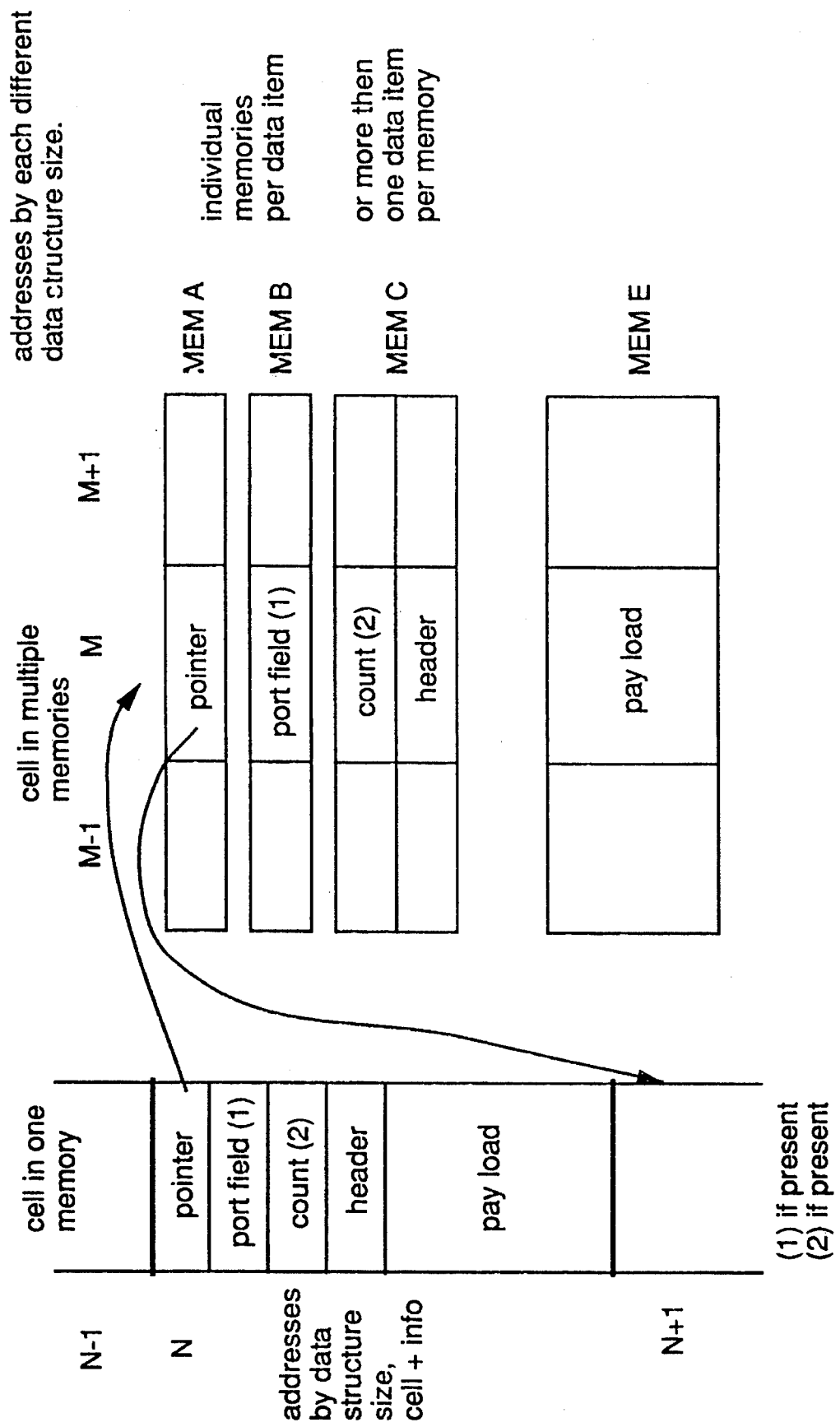
FIG. 8 and FIG. 9 are schematic representations of a cell memory.
Figures 15, 16, 17:
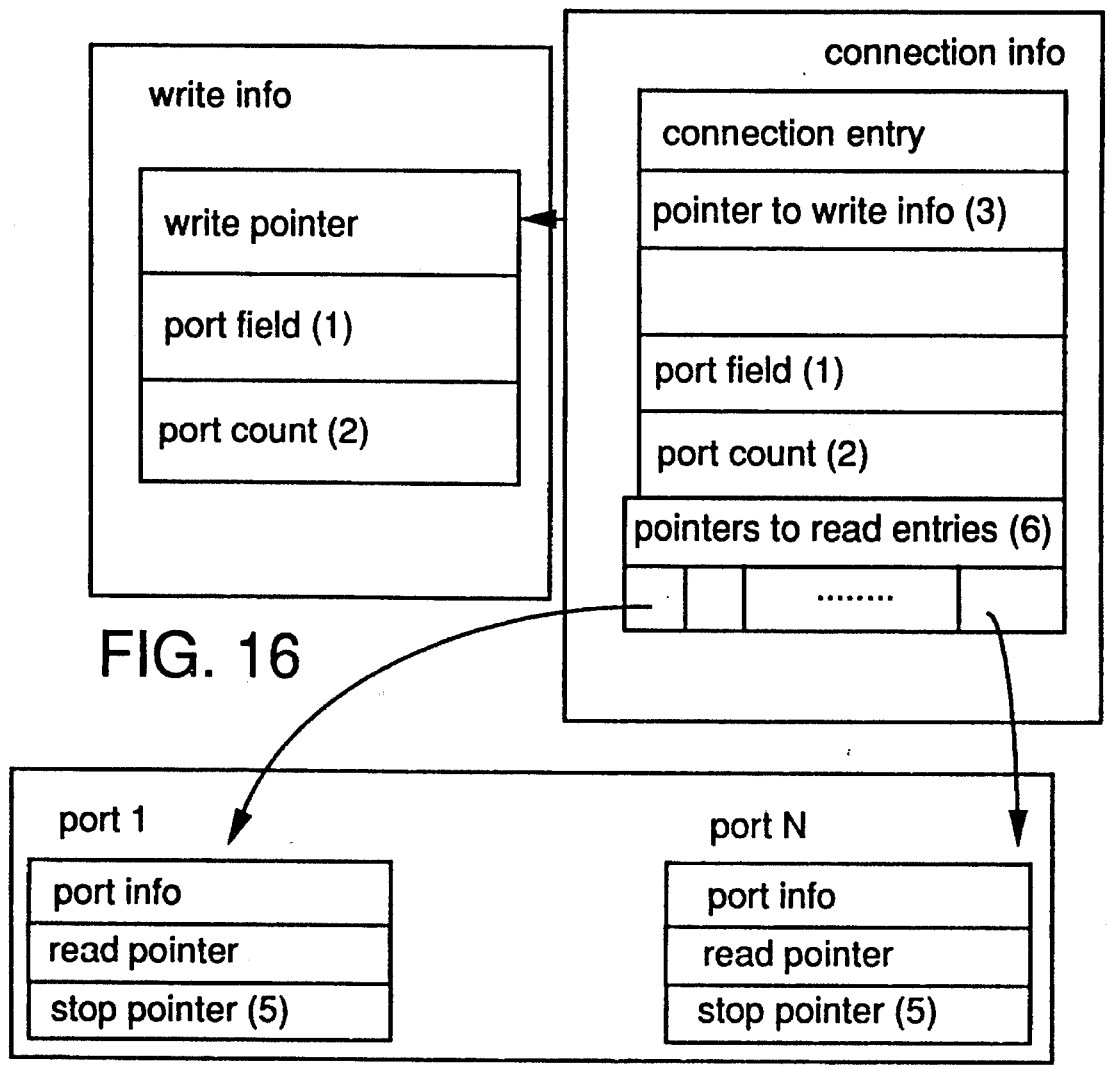

The write controller 42 of the system 28 receives cells from input and writes them to cell memory 46 (see FIG. 8 and FIG. 9), and updates the connection write information, gets cells 14 from and returns cells to the free list (managed by the controller 38), informs the controller 38 when a new cell 14 arrives for a connection, and what connection it arrived for. In FIG. 8 and 9, the cell 14 and its data can either be stored together in one memory or separately in different memories, with each item of data at the same address (where the addressing is by data item). The "different memories" can be physically separate (different chips), or logically separate (different regions of the same memory, or even interleaved i.e. all even numbered (word or data item) addresses 0, 2, 4 . . . are in "memory" A, and all odd numbered addresses 1, 3, 5, 7 are in "memory" B, where item "i" would be stored at physical address 2*i if it were in logical "memory" A, and at physical address (2*i)+1 if it were in logical "memory" B).

The system 28 is comprised of a connection write information memory 48, as shown in FIG. 10. The connection write information contains the pointer to either the last cell 14c in the linked list 10 for that connection or the location where the next cell 14 for that connection will be written (depending on whether or not the read pointer 16 optimization is performed). It also contains any of the "port field" or "port count" field which are needed but not contained in the general connection information.

The system 28 is also comprised of a connection read information memory 50, as shown in FIGS. 11 and 12. The connection read information has an entry for each port 18 which has a pointer to the cell 14 in the linked list 10. This cell 14 will be read out for that port 18 the next time this connection should send a cell 14 out the given port 18. Each entry will contain a stop pointer 26 if needed. Each entry has additional information such as a new header, since a connection might need a different VPI or VCI for each port 18 that it exits. If the connection read entries are stored separately, then there will be an array which is indexed by port number which contains pointers to the connection read entries for each port 18. As described in FIGS. 7, 10, 11, 12, 13, 14, 15, 16 and 17, the various memories may be physically separate, or they may be logical memories in one or more physical memories. In regard to these figures, they have the following nomenclature:

(3 & 4) only needed if read/write information is not stored adjacent to the connection entry in the same memory or stored in different memories in different locations (4) if the read information entries for different ports are stored together, then the read information pointer can point to one of them (5) id needed Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for multicasting comprising the steps of:

forming a first read pointer and at least a second read pointer, each read pointer corresponding to a first port and a second port, respectively, each read pointer pointing to a first cell to be transmitted out the first port and the second port;

choosing the first port;

locating the first read pointer for the first port;

reading the first cell to which the first read pointer is pointing;

choosing the second port;

locating the second read pointer for the second port;

pointing the second read pointer to the first cell;

reading the first cell to which the second read pointer is pointing; and pointing a cell pointer of the first cell to a second cell which is to be transmitted out of the first port and the second port, said second cell the only cell to which the first cell is pointing, said first cell and at least the second cell forming a linked list.

2. A method as described in claim 1 wherein the cell includes data.

3. A method as described in claim 2 including after the reading step, there is a step of pointing the first read pointer to the second cell pointed to by the cell pointer of the first cell.

4. A method as described in claim 3 including after the reading step, there is a step of sending the first cell out of the first port.

5. A method as described in claim 4 including after the pointing step, there is a step of checking whether the first cell will be sent out the second port.

6. A method as described in claim 5 including after the checking step, there is a step of freeing the cell if there is no other port the first cell will be sent out.

7. A method as described in claim 6 wherein the first cell includes a count which identifies all ports the first cell will be sent out, and after the sending step, there is a step of removing from the count, the first port; and wherein the freeing step includes a step of freeing the first cell if there is no other port the first cell will be sent out and there are no other ports in the count and the first cell is not pointing to the second cell.

8. A method as described in claim 7 including after the pointing step, a step of reading the second cell to which the pointer is pointing.

9. A method as described in claim 8 wherein the removing step includes a step of decrementing by 1 a value of the count equal to the number of ports the first cell will be sent out.

10. A method as described in claim 9 wherein the checking step includes a step of comparing a stop pointer value for the first port with a write pointer value for the first port, said write pointer pointing to a last cell of the linked list; and wherein the freeing step includes a step of freeing the first cell if the stop pointer value equals the write pointer value and no other port is to read the first cell.

11. A method as described in claim 9 including after the pointing step, there is a step of clearing a bit corresponding to the first port from a status field of the first cell; and wherein the freeing step includes a step of freeing the first cell if the status field is empty and the value of the count is equal to 0 and the first cell is not pointing to the second cell.

12. A method for multicasting comprising the steps of:

choosing a port;

locating a read pointer for the port;

reading a first cell to which the read pointer is pointing;

sending the first cell out the port;

removing from a count which identifies all ports the first cell will be sent out, the port;

choosing a second port;

locating a second read pointer for the second port;

sending the first cell out the second port;

pointing the read pointer to a second cell pointed to by a cell pointer of the first cell, said second cell the only cell to which the first cell is pointing, said first cell and second cell forming a linked list;

checking whether there is at least one other port the first cell will be sent out;

freeing the first cell if there is no other port the first cell will be sent out and there are no other ports in the count.

13. A method as described in claim 12 including after the pointing step, there is a step of reading the second cell to which the read pointer is pointing.

14. A method as described in claim 13 wherein the removing step includes a step of decrementing by 1 a value of the count equal to the number of ports the first cell will be sent out.

15. A method as described in claim 14 wherein the checking step includes a step of comparing a first stop pointer value for the port with a write pointer value for the port, said write pointer pointing to a last cell of the linked list; and wherein the freeing step includes a step of freeing the first cell if the first stop pointer value equals the write pointer value, and the value of the count is 0 and the first cell is not pointing to the second cell.

16. A method as described in claim 14 including after the pointing step, there is a step of clearing a bit corresponding to the first port from a status field of the first cell; and wherein the freeing step includes the step of freeing the first cell if the status field is empty and the value of the count is equal to 0.

17. A multicast system for an ATM network comprising:

a first port through which a cell and at least a second cell passes;

a first read pointer associated with the first port;

at least a second port through which the cell and the second cell passes;

at least a second read pointer associated with the second port;

a cell to which each read pointer points, said cell having a cell pointer, which points to a second cell;

a second cell, said second cell the only cell to which the cell points: and a controller for controlling when a read pointer reads the cell or the second cell.

18. A system as described in claim 17 including a plurality of cells, each cell having a cell pointer pointing to a next cell, the plurality of cells forming a linked list, said controller pointing a read pointer to the next cell after the cell the read pointer was pointing to is read.

19. A system as described in claim 18 including a mechanism for pointing to a last cell in the linked list.

20. A system as described in claim 19 wherein each cell has a count which identifies all ports the cell will be sent out, said controller removing a port from the count after the cell the read pointer is pointing to is read.

21. A system as described in claim 19 including a stop pointer corresponding with each read pointer, said stop pointer identifying the last cell that will be sent out the port, said controller freeing the cell if there is no other port the cell will be sent out and no ports in the count unless it is the last cell in the linked list.

22. A linked list for multicast in an ATM network comprising:

a memory;

a first cell having a cell pointer, said first cell stored in the memory;

a second cell stored in the memory, said second cell the only cell to which the first cell is pointing; and a plurality of read pointers stored in the memory, each read pointer associated with a respective of a plurality of ports, each read pointer pointing to the first cell, said first cell and said second cell to be transmitted out the plurality of ports.

23. A linked list as described in claim 22 wherein the first cell and second cell each include data.

24. A linked list as described in claim 23 wherein the first cell and second cell form a linked list, and including a write pointer pointing to the second cell, said write pointer pointing to where another cell is to be added to the linked list.

25. A linked list as described in claim 24 wherein the first cell and the second cell each have a count which identifies all ports the first cell and the second cell will be sent out.

26. A linked list as described in claim 25 including a stop pointer corresponding with each read pointer, said stop pointer identifying a last cell that will be sent out the associated port of the linked list.

27. A method for multicasting comprising the steps of:

receiving a first cell of a plurality of cells;

pointing a first read pointer corresponding to a first port and a second read pointer corresponding to a second port to the first cell;

receiving N−1 additional cells of the plurality of cells, where N≧2 and is an integer;

pointing a cell pointer of the first cell to a N-(N−2)$^{th}$ cell of the plurality of cells, said N-(N−2)$^{th}$ cell the only cell to which the first cell points, said plurality of cells forming a linked list of cells with the only cell each cell points to being a subsequent cell of the linked list;

transmitting the first cell out the first port; and transmitting the first cell out the second port.

28. A method as described in claim 27 including after the step of pointing a cell pointer of the first cell, there is a step of pointing a write pointer to the N$^{th}$ cell of the plurality of cells.

29. A method as described in claim 28 including after the step of receiving N−1 additional cells, there is a steps of receiving an (N+1)$^{th}$ cell of the plurality of cells;

pointing a cell pointer of the N$^{th}$ cell to the N$^{th}$+1 cell, said N$^{th}$+1 cell the only cell to which the N$^{th}$ cell points; and pointing the write pointer to the N$^{th}$+1 cell.

30. A method as described in claim 29 including after the step of pointing a first read pointer, there is a step of setting a count of the first cell equal to a number of ports that will ultimately receive the first cell for output; and after the step of receiving N−1 additional cells, there is the step of setting a count of each additional cell of the plurality of cells to the first cell equal to a number of ports that will ultimately receive the respective cell of each additional cell.

31. A method as described in claim 30 including after the step of pointing a first read pointer, there is a step of setting a status field of each cell with bits at corresponding locations which identify the respective ports to which the respective cell will ultimately be sent out.

32. A method as described in claim 31 including after the step of pointing a write pointer, there is a step of setting a status field of the write pointer identical to the status field of the first cell.

33. A method as described in claim 32 including after the step of pointing a cell pointer of the first cell, there is a step of pointing a stop pointer corresponding to the first read pointer to a cell of the linked list which is a last cell which is to be transmitted out the first port.

34. A method for multicasting comprising the steps of:

pointing a first read pointer corresponding to a first port at a cell of a linked list of cells which is a first cell of the linked list of cells to be transmitted out the first port with the only cell each cell points to being a subsequent cell of the linked list;

pointing a second read pointer corresponding to a second port at a cell of the linked list of cells which is the first cell of the linked list of cells to be transmitted out the second port;

adding a new cell to the linked list of cells by pointing to the new cell from only a pointer from one cell in the linked list to the new cell, each cell having only one pointer pointing to another cell;

transmitting the cell at which the first read pointer is pointing out the first port; and transmitting the cell at which the second read pointer is pointing out the second port.

35. A multicast system for an ATM network comprising:

a first port through which a cell passes;

a first read pointer associated with the first port;

at least a second port through which the cell passes;

at least a second read pointer associated with the second port;

N cells, where N≧2 and is an integer, each read pointer pointing to a first cell of the N cells, each cell having only one cell pointer, each cell pointing only to a next cell of the N cells; and a controller for controlling when a read pointer reads a cell.

36. A method for multicasting comprising the steps of:

forming a first read pointer and at least a second read pointer, each read pointer corresponding to a first port and a second port, respectively, each read pointer pointing to a first memory location;

choosing the first port;

locating the first read pointer for the first port;

reading a first cell to which the first read pointer is pointing to the first memory location, said first cell to be transmitted out the first port and the second port;

choosing the second port;

locating the second read pointer for the second port;

reading the first cell to which the second read pointer is pointing; and pointing a cell pointer of the first cell to a second cell which is to be transmitted out of the first port and the second port, said second cell the only cell to which the first cell is pointing, said first cell and at least the second cell forming a linked list.

* * * * *